(12) United States Patent  
Kelsey et al.

(10) Patent No.: US 9,220,050 B2
(45) Date of Patent: Dec. 22, 2015

(54) MESH NETWORK DEFRAGMENTATION (71) Applicant: Silicon Laboratories, Inc., Austin, TX (US)

(72) Inventors: Richard Kelsey, Belmont, MA (US); Matteo Paris, Concord, MA (US)

(73) Assignee: Silicon Laboratories Inc., Austin, TX (US)

( * ) Notice: Subject to any disclaimer, the term of this patent is extended or adjusted under 35 U.S.C. 154(b) by 276 days.

(21) Appl. No.: 14/041,080

(22) Filed: Sep. 30, 2013

(65) Prior Publication Data

US 2015/0092530 A1    Apr. 2, 2015

(51) Int. Cl.
*H04L 12/28* (2006.01)
*H04W 40/24* (2009.01)

(52) U.S. Cl.
CPC .................................. *H04W 40/244* (2013.01)

(58) Field of Classification Search
CPC .................................................. H04W 40/244
See application file for complete search history.

(56) References Cited

U.S. PATENT DOCUMENTS

| | | | | |
|---|---|---|---|---|
| 5,023,871 A | * | 6/1991 | Nakayashiki et al. | 370/455 |
| 6,343,320 B1 | * | 1/2002 | Fairchild et al. | 709/224 |
| 2007/0047588 A1 | * | 3/2007 | Koga et al. | 370/501 |
| 2010/0080157 A1 | * | 4/2010 | Stewart | 370/311 |
| 2010/0100468 A1 | * | 4/2010 | Spector et al. | 705/35 |
| 2013/0109313 A1 | * | 5/2013 | Kneckt et al. | 455/41.2 |
| 2015/0092530 A1 | * | 4/2015 | Kelsey et al. | 370/216 |
| 2015/0092606 A1 | * | 4/2015 | Kelsey et al. | 370/255 |

* cited by examiner

*Primary Examiner* — Robert Wilson
(74) *Attorney, Agent, or Firm* — Nields, Lemack & Frame, LLC (57) ABSTRACT

Methods of reassembling a mesh network which has been disrupted by the unavailability of a node or a link are disclosed. Nodes continuously receive beacon messages originating from a leader node. These beacon messages may be transmitted directly by the leader node, or may have been retransmitted by an intermediate node. When a node determines that it has not received a beacon message in a certain time period, it concludes that it is now disconnected from that leader node. At this point, it may choose to act as a leader node and form a new network, or may join with another network. The determination of which network to join may be based on some indicia associated with the leader node of that network.

11 Claims, 9 Drawing Sheets

MESH NETWORK DEFRAGMENTATION

This disclosure describes methods of reassembling a mesh network that may become fragmented due to the loss of one or more nodes or the loss of one or more links between nodes.

BACKGROUND

Mesh networks are a type of network in which nodes often have several functions. In addition to their primary function as a sensor, actuator, or other device, these nodes also serve as routers, helping move traffic between two other nodes in the network. Mesh networks can grow quite large, often having over 100, or in some case over 1000, nodes, many or most of which are also routers.

While mesh networks tend to be robust, since there are often multiple paths between any two nodes, there are drawbacks as well. For example, with such a large number of nodes, it is often difficult to ensure that all nodes maintain a connection with the mesh network. For example, assume one or more nodes are part of a mesh network, but their connectivity to that network is through a single node. If that node or the link to that node were to stop functioning, this group of nodes may no longer be able to communicate with the network. Thus, these nodes may cease to be part of the mesh network and become a network fragment.

This network fragment may remain a group of connected nodes that have connectivity between each other. In other embodiments, the network fragment may be two or more completely disconnected nodes. In this embodiment, these fragmented nodes may not attempt to form a new network, and therefore cease to be functional.

If a node later becomes available that could re-enable connectivity for one or more nodes in this network fragment, it may be difficult to add these nodes back to the mesh network. For example, these nodes may no longer recognize the original network. Alternatively, if the fragment has formed a new, smaller mesh network, it may not seek to join the original mesh network.

Therefore, it would be beneficial is there were a method of resolving network fragmentation. For example, a method that allowed disconnected nodes to form a connected network fragment may be advantageous. Furthermore, it would be advantageous if there were a method to reconnect this network fragment back to the original network, if a new node that allows such connectivity becomes available.

SUMMARY

Methods of reassembling a mesh network which has been disrupted by the unavailability of a node or a link are disclosed. Nodes continuously receive beacon messages originating from a leader node. These beacon messages may be transmitted directly by the leader node, or may have been retransmitted by an intermediate node. When a node determines that it has not received a beacon message in a certain time period, it concludes that it is now disconnected from that leader node. At this point, it may choose to act as a leader node and form a new network, or may join with another network. The determination of which network to join may be based on some indicia associated with the leader node of that network.

In one embodiment, a method of creating a mesh network having a single leader node, from a plurality of nodes, is disclosed. Each of the plurality of nodes executes the same method, where that method comprises: receiving one or more beacon messages at the node, wherein each of the nodes sending a beacon message temporarily assumes leader node status, and wherein each of the beacon messages comprises a unique indicia associated with the sending node; comparing, at the receiving node, the indicia of each of the received beacon messages; selecting a leader node based on the comparison; and retransmitting from the receiving node the beacon message comprising the indicia of the selected leader node.

According to a second embodiment, a method of creating a connected network fragment from a plurality of nodes, formerly connected to an original mesh network, is disclosed. This method is executed by each of the plurality of nodes, and method comprises: monitoring a time since a beacon message was last received at a node; determining, based on the monitored time, that the node is no longer connected to the original mesh network; sending, based on the determination, a beacon message comprising an indicia that identifies the node as a leader node; receiving a beacon message from another node, the received beacon message comprising an indicia identifying a second potential leader node; and determining whether the node should join network associated with the second potential leader node or continue as a leader node, based on the indicia.

According to a third embodiment, a method for a node to switch network association within a mesh network having a first leader node is disclosed. This method comprises: receiving at the node a beacon message comprising an indicia of the first leader node; receiving at the node a second beacon message comprising an indicia of a second leader node; comparing the indicia to determine which of the first leader node and the second leader node has a higher priority; and transmitting a beacon message comprising an indicia of the leader node having the higher priority.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
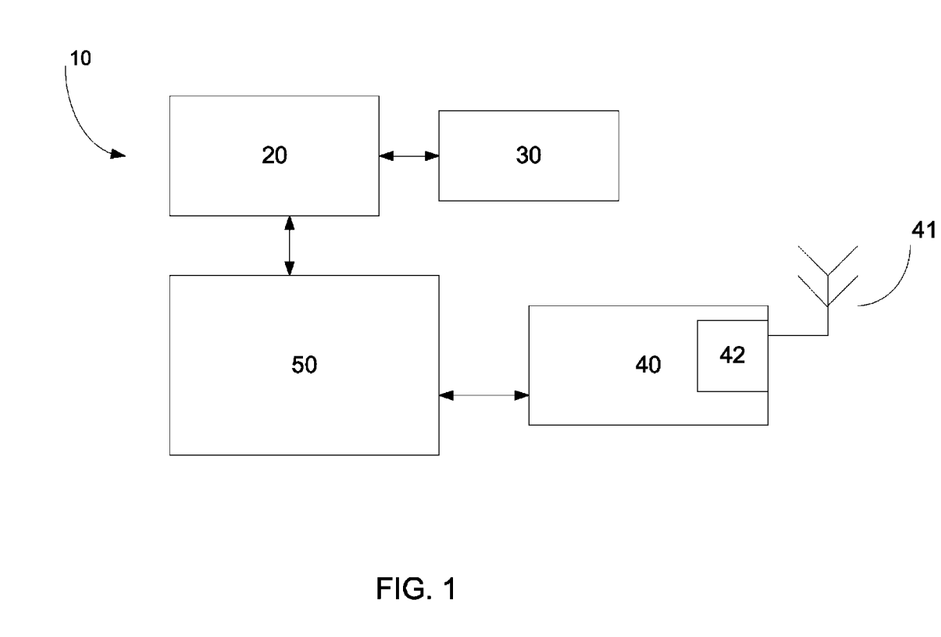
FIG. 1 is a block diagram of a node in a mesh network.

Devices that are used in mesh networks are typically small, often battery powered. FIG. 1 shows a block diagram of a representative device 10. The device 10 has a processing unit 20 and an associated memory device 30. This memory device 30 contains the instruction, which, when executed by the processing unit, enable the device 10 to perform the functions described herein. This memory device 30 may be a non-volatile memory, such as a FLASH ROM, an electrically erasable ROM or other suitable devices. In other embodiments, the memory device 30 may be a volatile memory, such as a RAM or DRAM. The device also includes a network interface 40, which is typically a wireless interface including an antenna 41. Additionally, the network interface may comprise a radio 42, which includes the baseband processing and MAC level processing. The device 10 may include a second memory device 50 in which data that is received by the network interface 40, and data that is to be transmitted by the network interface 40, is stored. This second memory device 50 is traditionally a volatile memory. The processing unit 20 has the ability to read and write the second memory device 50 so as to communicate with the other nodes in the network. Although not shown, each device 10 also has a power supply, which may be a battery or a connection to a permanent power source, such as a wall outlet.

As described above, one of the issues associated with mesh networks is that of network fragmentation, and the issues associated with reconnecting these fragments.

In one embodiment, a mesh network may have a leader node. This leader node may be responsible for, for example, maintaining the list of routers currently in the network, the list of nodes currently part of the network and for allowing new nodes to join the mesh network. Another responsibility of the leader node may be to generate periodic beacon messages. These beacon messages may be used to indicate that the mesh network is still functional, and that the leader node is still active. In addition, beacon messages are propagated by each router in the mesh network. In other words, once a node receives the beacon message from the leader node, or from another node, it then transmits that beacon again. In this way, the beacon is disseminated to all nodes in the network.

The periodic beacon message also provides a way for nodes in the network to determine that they are still in communication with that mesh network. For example, it may be established that beacon messages are to be sent by the leader node every T seconds. These beacon messages are then propagated by the nodes in the network. Therefore, if a node has not received a beacon message for more than T0 seconds, where T0 is greater than or equal to T, it may determine that it is no longer connected to that mesh network. In another embodiment, the beacon message may include time value or sequence number, which serves as an indication of how long ago it was sent, or to distinguish between different beacon messages. A node may use this time value of sequence number to determine that it is no longer connected to that mesh network.

In response, it may attempt to send a message back to the leader node. Alternatively, it may seek to join or start another mesh network.

In one embodiment, nodes that determine that they are no longer part of the original mesh network may each attempt to start or join new mesh networks. This behavior may be preferable to the nodes simply remaining individually disjointed. In a further embodiment, these nodes will also abandon this new mesh network if the opportunity to connect to the original mesh network becomes available at a later time.

An important aspect of this is to insure that the behavior of all of the nodes is deterministic. In other words, it is important that the behavior of each node is predictable, so that the fragmentation and defragmentation of the mesh network occurs seamlessly.

Figure 2:
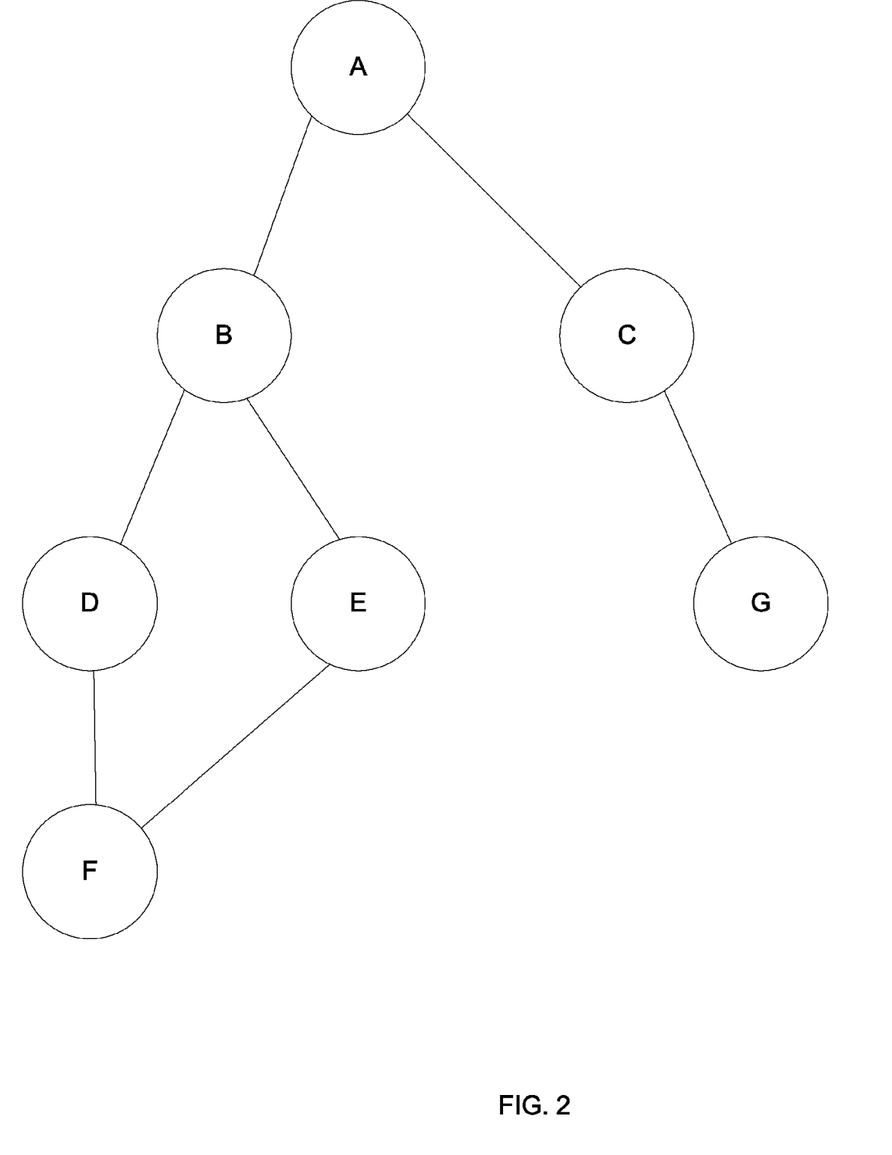
FIG. 2 is an exemplary network topology.

Consider a network topology shown in FIG. 2. In this topology, Node A is the leader node. Node B and Node C is within the listening range of Node A. Similarly, Node E and Node D are in the listening range of Node B, Node G is in the listening range of Node C, and Node F is in the listening range of Node D and Node E. During normal operation, Node A sends out a beacon message. This beacon message is received by Node B and Node C. Node C retransmits the beacon message, which is received by Node G. Similarly, Node B retransmits the beacon message which is received by Node D and Node E. Nodes D and E retransmit the beacon message, which is received twice by Node F. This procedure is repeated periodically, so that the mesh network is aware of its current state. In some cases, the beacon message may be referred to as a "keep alive" message, as it informs each node in the network that the leader node is still alive and connected to that node.

Figure 3:
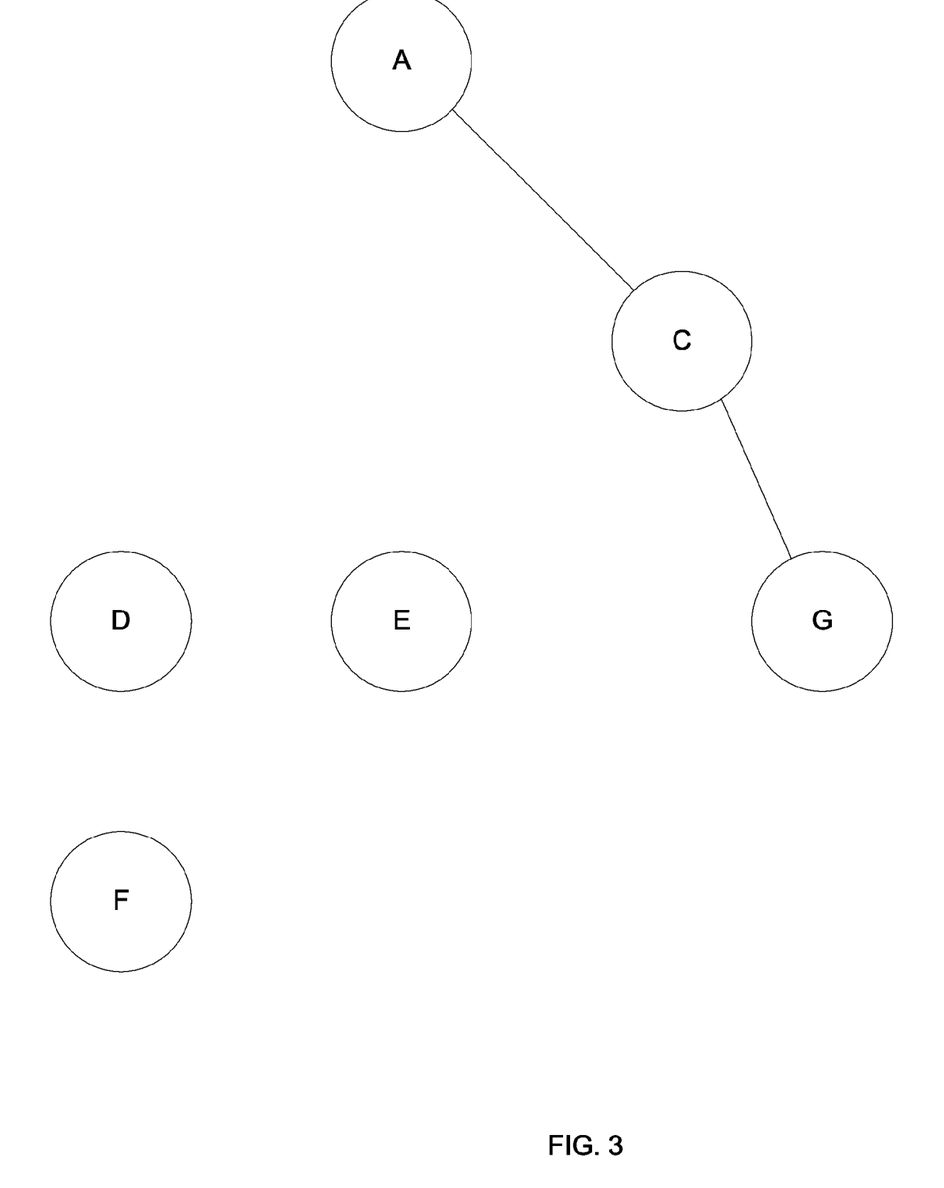
FIG. 3 shows the network of FIG. 2 after Node B becomes unavailable.

Assume that at a later time, Node B becomes unavailable. Alternatively, Node B may still be available, but due to changes in topology, the link from Node B to Node D and Node E is no longer active. This action effectively separates Nodes D, E and F from the original mesh network, as shown in FIG. 3. Specifically, when Node A transmits a beacon message, that message cannot be received by Nodes D, E and F. Thus, the original network is effectively reduced to Nodes A, C and G. The original network continues operating with its reduced number of nodes, where Node A remains the leader node.

However, Nodes D, E and F are now disconnected. In one embodiment, each of these nodes individually attempts to form new mesh networks, which may then combine to form a single network consisting of all of these nodes.

Another function of the beacon message is that it may serve as an invitation to join a network in which the node that originates the beacon message is the leader node. In FIG. 2, the mesh network may be identified as Node A's network, since Node A is the leader node. Thus, if a node receives a beacon message from another node, it has the option of electing to join that mesh network. In FIG. 3, Node A's network now consists of only Nodes A, C and G. Nodes D, E and F have not formed a new mesh network.

Thus, the first issue associated with new network formation is the selection of a leader node. Since Nodes D, E and F were not previously leader nodes, there is no obvious choice for the selection of a new leader node. In one embodiment, each of the Nodes D, E, and F sends out its own beacon message, thereby assuming, at least temporarily, that it will be the new leader node. In another embodiment, each node determines a delay time to wait before becoming a leader node. This delay time can be adjusted depending on the suitability of the node for being a leader, with more suitable nodes choosing a shorter delay time.

Suitability of a node to be a leader may be based on many different criteria. For example, in one embodiment, a node may be more suitable if it is disposed near the center of the network or has better connectivity to other nodes in the network. This may be determined based on the number of neighbors a particular node has. In another embodiment, it may be based on the routing costs to other nodes in the network.

In another embodiment, a node may be more suitable if it is a more capable device. While the leader node does not have many additional functions, it may be beneficial to prefer the more capable devices.

In another embodiment, the suitability of a leader may be specific to the particular application or deployment. For example, if a purpose of the network is to collect data, it may be preferable to require that the leader node be a data collection point, as a fragment without a data collection point has less value.

Of course, other criteria may also be used to determine the suitability of a node to be a leader node. Using whatever criteria are appropriate, a node would calculate a suitability score and adjust its delay time before sending a beacon message depending on the score.

Thus, after determination that it is no longer receiving beacon messages, the node waits this delay time before sending out a beacon message. This option allows other nodes with shorter delay times to send out their beacon messages first and also avoids channel access contention on the wireless network.

Thus, according to one embodiment, each node, upon determining that it no longer is receiving beacon messages sends out its own beacon message, attempting to become a leader node. In a second embodiment, upon making this determination that it is not receiving beacon messages, each node waits a delay time, unique to the node, before sending out a beacon message. If a beacon message is sent by another node during the time that this node is waiting, this node may not send its beacon message. Note that it is not important which node becomes the leader node. The only requirement is that there is a leader node, and that each time a fragment is created, a new leader node is selected.

Thus, there are at least two embodiments in which one or more of Nodes D, E and F transmit beacon messages. The next requirement is that these nodes are able to select a single node to be the leader node. For example, it is not advisable that Node D becomes a leader node, Node E joins that group but Node F does not. Similarly, it is not advisable that two different nodes become leader nodes. For example, it is not advisable that both Node D and Node E believe that they are each the leader node.

Therefore, a deterministic mechanism by which each node independently and individually selects which leader node's network to join is required. Additionally, this mechanism is preferably identical for all nodes, so that every node, given the same options, selects the same leader node's network to join. By way of example, assume that Node D and Node E each send out beacon messages. Node F must decide which of these nodes to join. Similarly, Node D and Node E will receive each other's beacon messages. Each must decide whether to remain a leader node or join the other's network. If Node D elects to join Node E's network, but Node F accepts Node D's beacon message, then the nodes may be unable to form a single connected fragment.

In one embodiment, the beacon message contains some indicia about the leader node. This indicia may be its MAC address, its serial number, or some other quantity. Preferably, this indicia is unique to each node in the mesh networks. When a node receives a beacon message, it notes the value of this indicia. If, in the example above, Node F receives beacon messages from Node D and Node E, it may use the indicia embedded in each of these beacon messages to determine which Node it will join. One possible implementation is that higher numbered MAC addresses are always selected to be leader nodes. In this embodiment, Node F will compare the MAC address of Node D with that of Node E. It will then select to join the network whose "leader' node has the higher MAC address.

Thus, through the use of a unique indicia embedded in the beacon message, a deterministic way can be created by which a node, with no current network association, selects a leader node.

Note that in the earlier description, it was possible, and in some embodiments, even preferable, that more than one node assumes that it is the leader node. Therefore, a mechanism by which a node relinquishes its leader node status is also required. In one embodiment, this mechanism is the same as that described above with respect to Node F. Specifically, if a leader node receives a beacon message from another node, it will examine the MAC address (or other indicia of interest) in that beacon message. If that indicia is determined to have higher priority than that of this node, this node will relinquish its leader node status and join this other network, thereby disassembling its own network.

Figure 4:
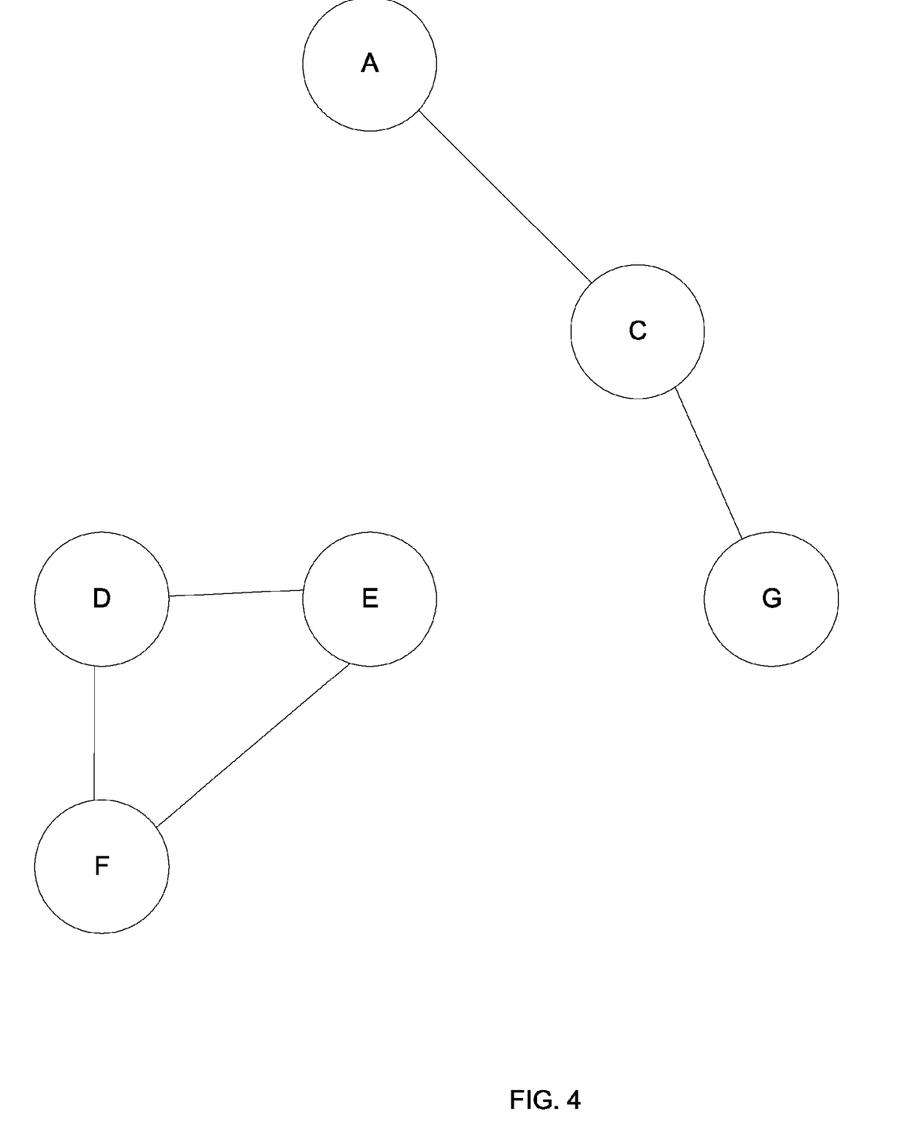
FIG. 4 shows the creation of two mesh networks after Node B becomes unavailable.

Consider the fragment in FIG. 3. Assume that Node D and Node E both assume to be leader nodes and send out beacon messages. Node F will receive both. According to one embodiment, it will compare unique indicia, such as MAC address, embedded in each beacon message. Based on this comparison, it will decide to join one of the networks, such as Node E's network. Node D will also receive the beacon message from Node E. Upon examination, it too determined that Node E has higher priority than it does, and will relinquish its leader node status, thereby joining the network of Node E. Similarly, Node E will receive a beacon message from node D, since its indicia has higher priority than that of Node D, it will remain a leader node. Thus, the three nodes have formed a single network fragment, with Node E as the new leader node, as shown in FIG. 4. Once a node elects to join a particular network, it also retransmits beacon messages received from that network. Thus, once Node F decides to join Node E's network, it will retransmit any beacon messages received that indicate that Node E is the leader node. In addition, it will not retransmit any beacon messages which indicate that Node D is the leader node.

Thus, the above described algorithm can be used to allow nodes to temporarily assume leader node status, send beacon messages, and resolve conflicts between contending leader nodes. Thus, it is possible for the disconnected nodes of FIG. 3 to join and form a network fragment having Node E as the leader node, as shown in FIG. 4.

Figure 5A:
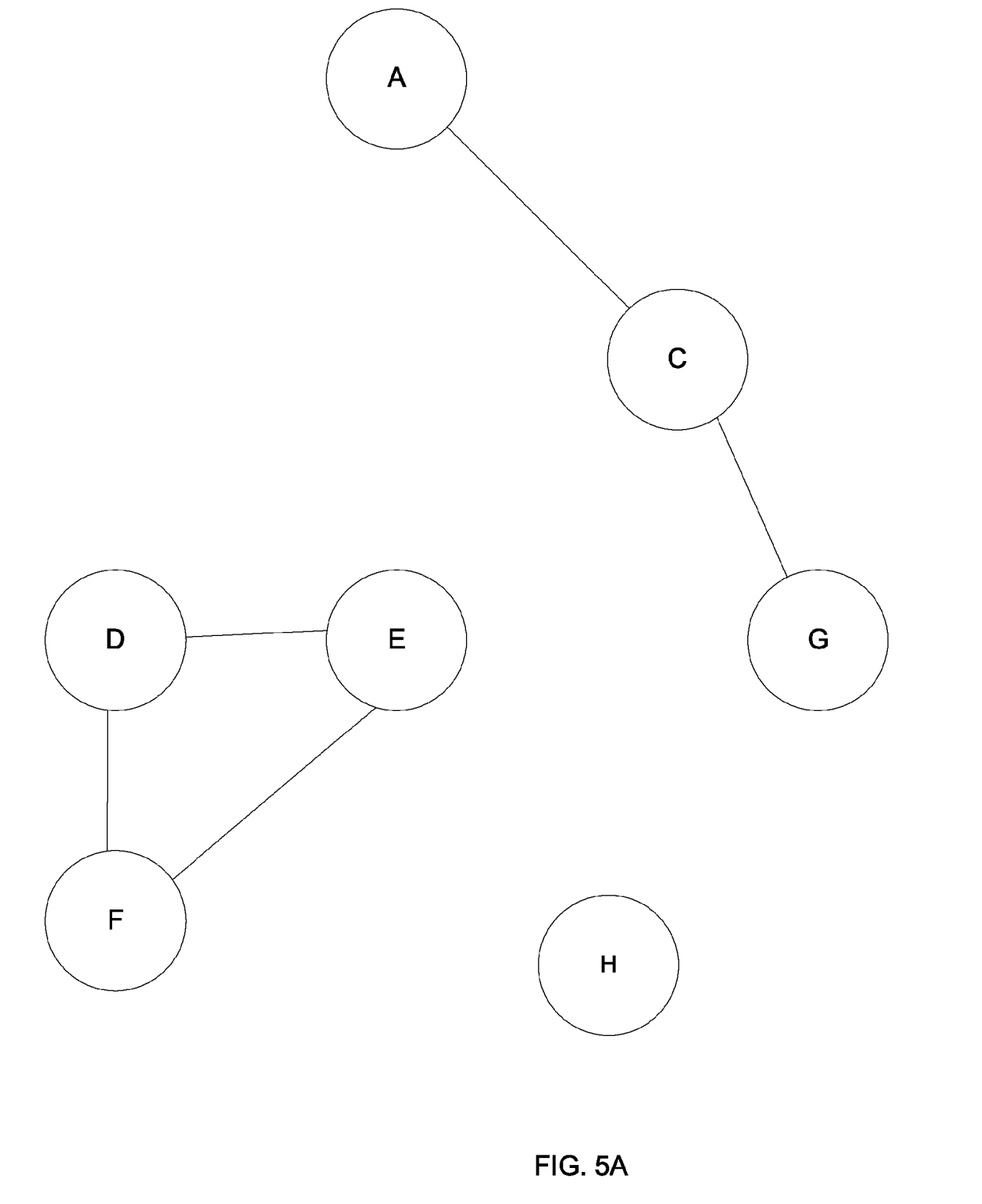
FIGS. 5A-5E show a progression where the nodes contained in network of FIG. 4 all become reconnected as a single mesh.
Figure 5B:
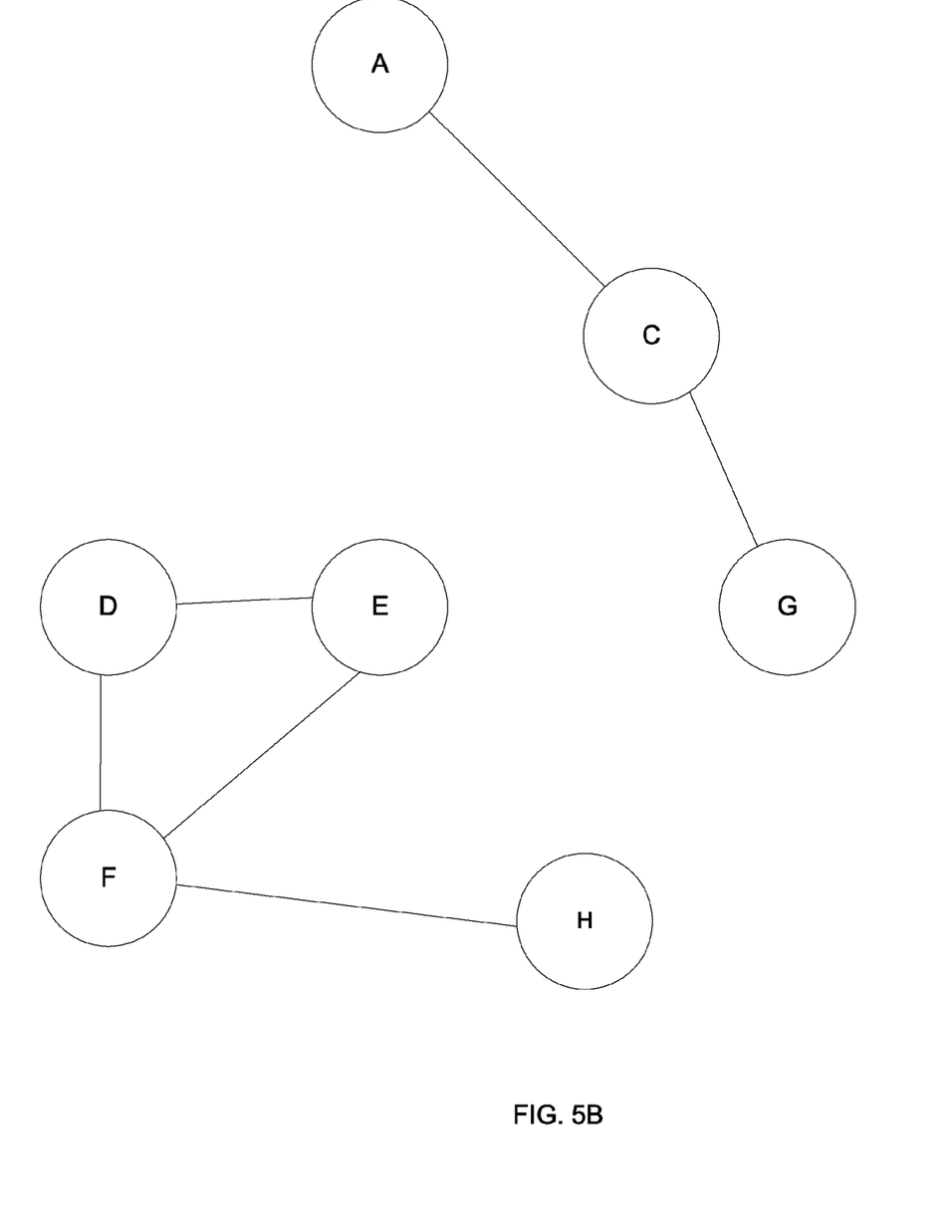

In some embodiments, the goal may be to re-establish a single mesh network that includes all of the nodes shown in FIG. 4. Assume that a new node, Node H, becomes available. This new node is within the listening range of Node F and Node G. Therefore, it is able to receive beacon messages from Node G, where Node A is the leader node identified in that beacon message. Node H also received a beacon message from Node F, which identified Node E as the leader node. Using the algorithm described above, Node H compares the indicia contained in these beacon messages to determine which mesh network to join. Assume that Node E has higher priority than Node A. In this scenario, Node H will join Node E's network, as shown in FIG. 5B.

Figure 5C:
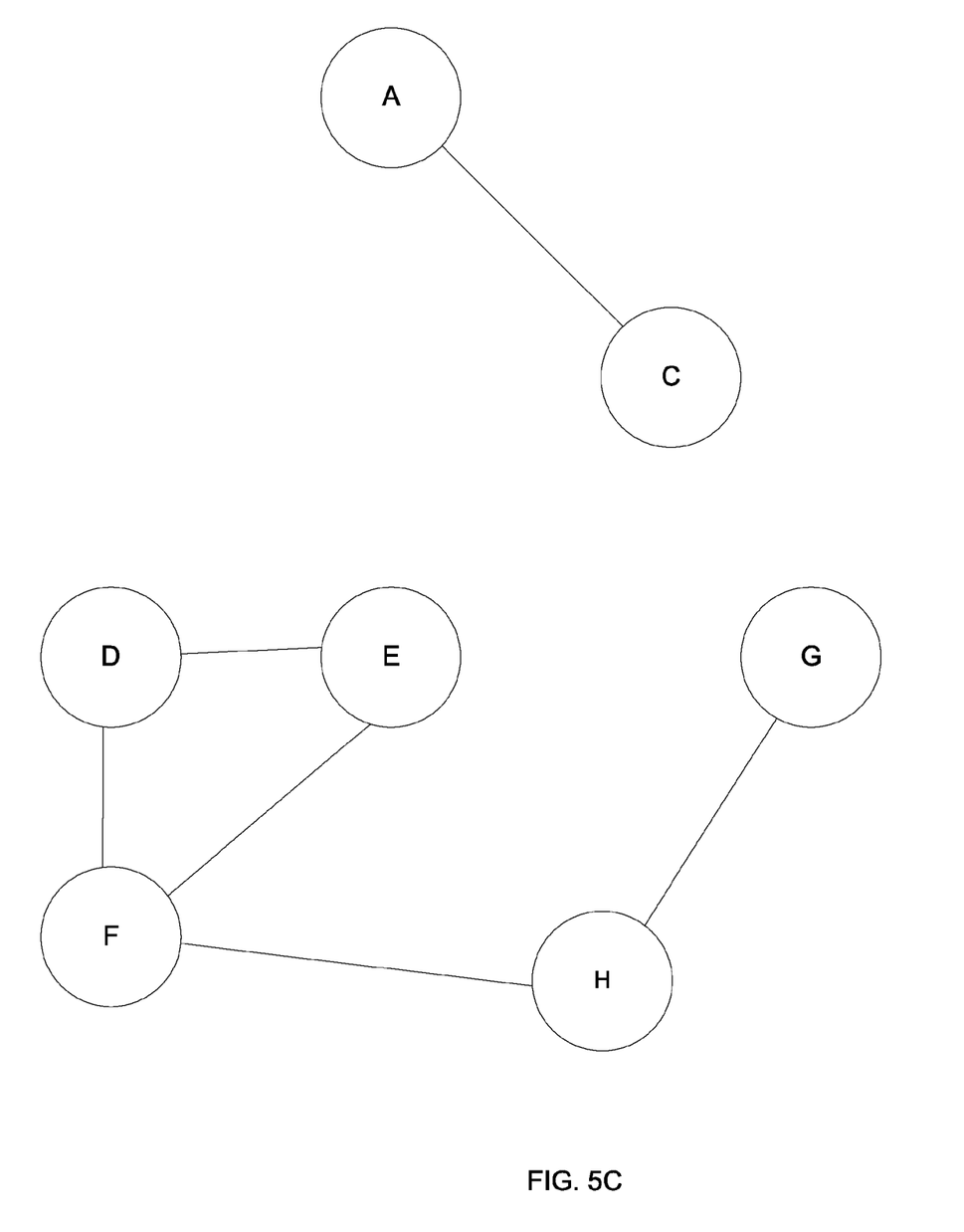

Since Node H has decided to join Node E's network, it will also retransmit the beacon messages that it receives from that network. Thus, at a later time, Node G will receive a beacon message from Node H, which identifies Node E as the leader node. Since Node E has higher priority than Node A, Node G changes its association from Node A to Node E, as shown in FIG. 5C.

Figure 5D:
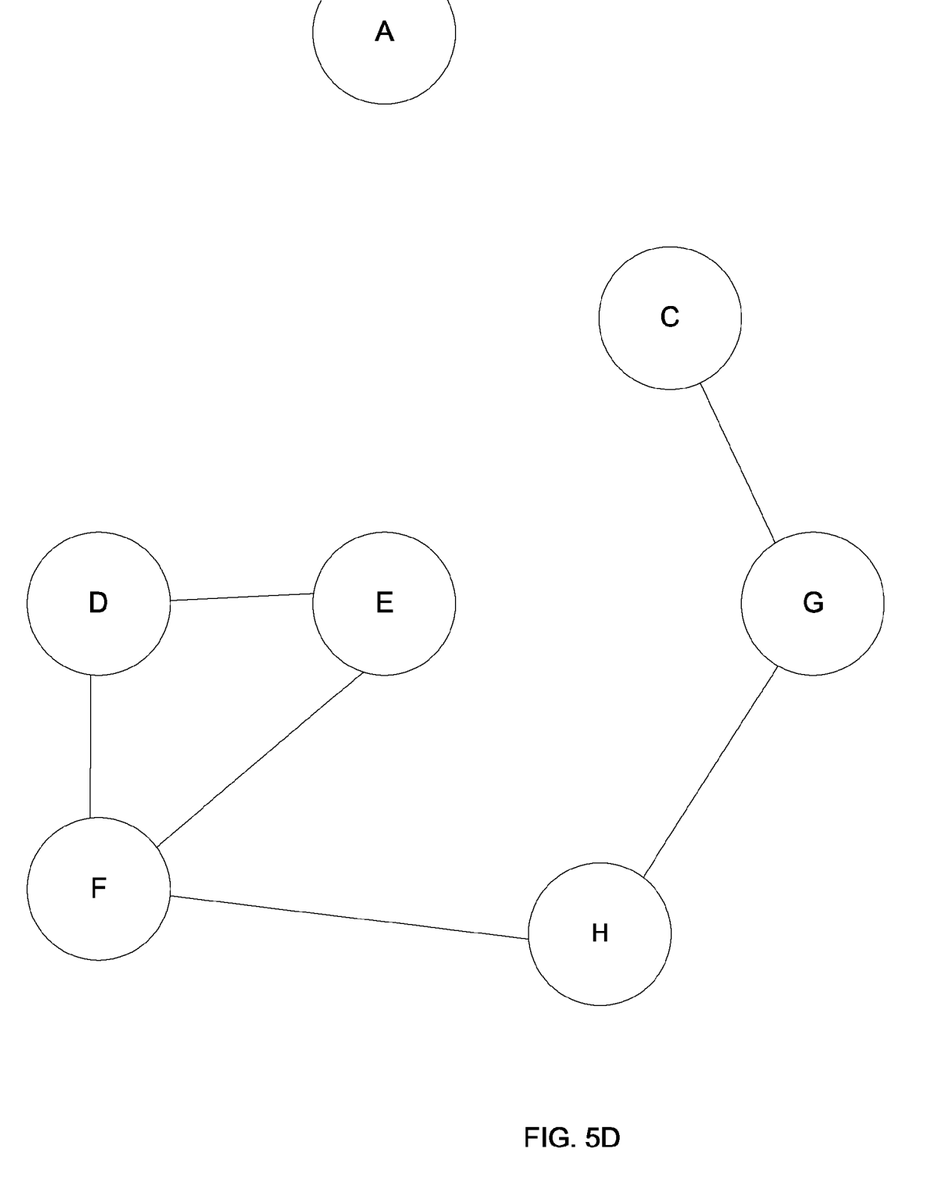

This process repeats again, where now Node C receives beacon messages from Node G, with Node E identified as the leader node, and from Node A. It also elects to join Node E's network, as shown in FIG. 5D. Node C will now retransmit beacon messages which indicate that Node E is the leader node.

Figure 5E:
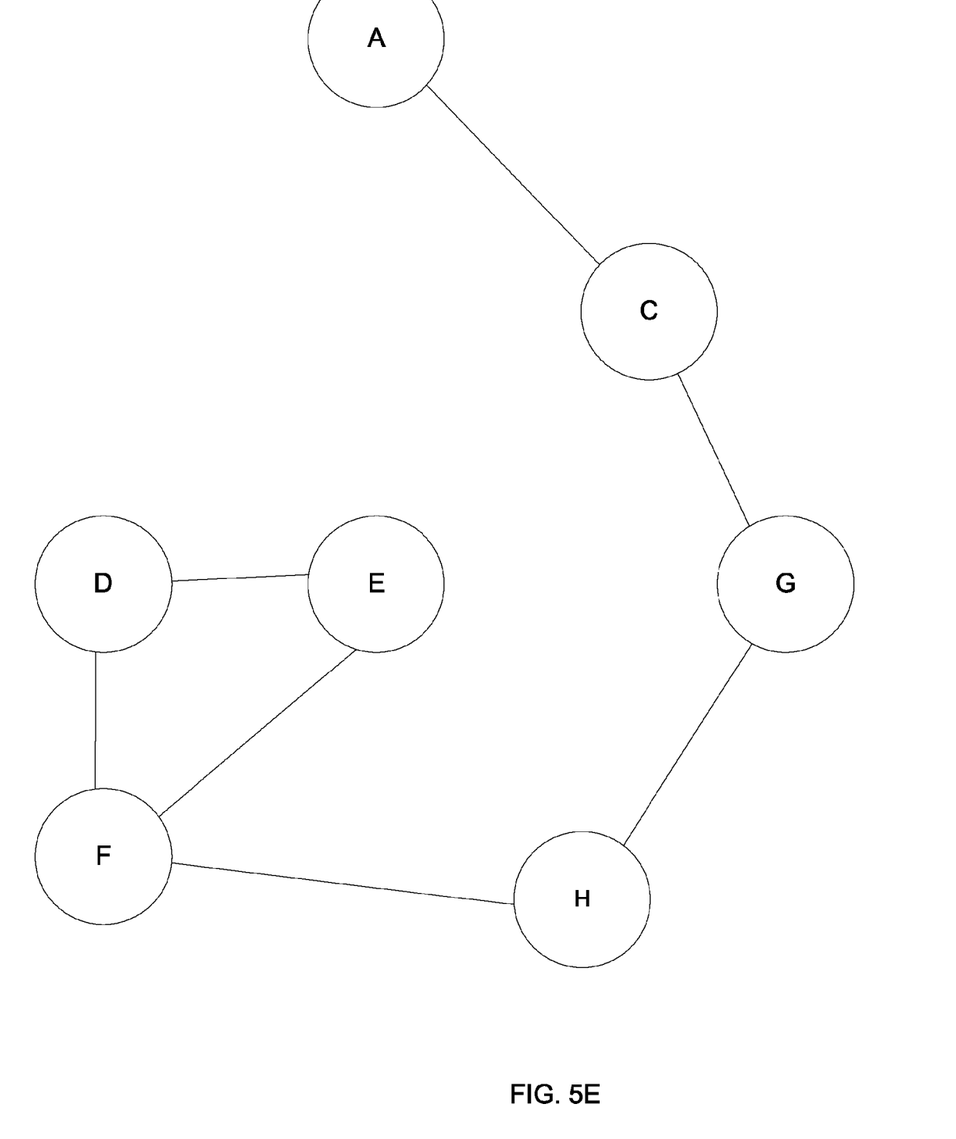

Finally, Node A receives a beacon message from Node C, identifying Node E as the leader node. It also elects to join this network, as shown in FIG. 5E. Note that all of the node that were present in FIG. 3 are now part of a single network. However, the leader node of this new network is different than that of FIG. 2. However, this is unimportant, as any node is capable of becoming a leader node and there are few functions that are unique to this node. For example, the leader node is responsible for originating beacon messages, assigning Router IDs, and maintaining a list of routers in the network. However, the capability to perform these functions may be included in all of the nodes.

Furthermore, also note that the final network shown in FIG. 5E would look the same if Node A had been determined to have higher priority than Node E. Note as well, that, in that scenario, the sequence shown in FIGS. 5B-5D would have differed, as it would have been Nodes F, D and E which would have been changing their network association.

Thus, the use of beacon messages with embedded indicia that is unique to the leader node allows algorithms to be developed which allow fragmented networks to rejoin together, when a connecting node becomes available. These algorithms allow a node, having no network association, to select between two or more networks. Furthermore, these algorithms allow a node, which is already associated with one network, to switch its association if a higher priority network becomes available. Finally, these algorithms allow a leader node to relinquish its status if it receives a beacon message that identifies a leader node with higher priority.

The above disclosure describes nodes having relative priorities. As suggested above, the choice of which node has higher priority is unimportant and not limited by the present disclosure. Rather, it is more important that the indicia used to determine priority is unique for each node, such that there is a deterministic result in all scenarios. While MAC address and serial number are specifically identified as indicia that can be used, the disclosure is not limited to these embodiments. For example, a unique parameter may be installed in the memory device of each node during the manufacturing process.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of creating a mesh network having a single leader node, from a plurality of nodes, wherein each of said plurality of nodes executes said method, said method comprising:
   receiving one or more beacon messages at said node, wherein each node sending a beacon message temporarily assumes leader node status, and wherein each of said beacon messages comprises a unique indicia associated with said sending node;
   comparing, at said receiving node, said indicia of each of said received beacon messages;
   selecting a leader node based on said comparison; and
   retransmitting from said receiving node said beacon message comprising said indicia of said selected leader node,
   wherein said method is repeated until all of said plurality of nodes have selected the same leader node.

2. The method of claim 1, wherein said indicia comprises a MAC address.

3. The method of claim 1, wherein said indicia comprises a serial number.

4. A method of creating a connected network fragment from a plurality of nodes, formerly connected to an original mesh network, said method executed by each of said plurality of nodes, said method comprising:
   monitoring a time since a beacon message was last received at a node;
   determining, based on said monitored time, that said node is no longer connected to said original mesh network;
   sending, based on said determination, a beacon message comprising an indicia that identifies said node as a leader node;
   receiving a beacon message from another node, said received beacon message comprising an indicia identifying a second potential leader node; and
   determining whether said node should join network associated with said second potential leader node or continue as a leader node, based on said indicia.

5. The method of claim 4, wherein said node delays an amount of time after said determination and before said sending.

6. The method of claim 5, wherein said amount of time is determined based on suitability of said node to be a leader node.

7. The method of claim 6, wherein said suitability is based on connectivity of said node to others of said plurality of nodes in said mesh network.

8. The method of claim 4, further comprising
   determining said second potential leader node has higher priority;
   ceasing sending of said beacon message comprising an indicia that identifies said node as a leader node; and
   retransmitting beacon messages comprising an indicia that identifies said second potential leader node.

9. The method of claim 4, further comprising:
   determining said second potential leader node has lower priority; and
   continuing to send said beacon message comprising an indicia that identifies said node as a leader node.

10. A method for a node to switch network association within a mesh network having a first leader node, comprising:
    receiving at said node a beacon message comprising an indicia of said first leader node;
    receiving at said node a second beacon message comprising an indicia of a second leader node;
    comparing said indicia to determine which of said first leader node and said second leader node has a higher priority; and
    transmitting a beacon message comprising an indicia of said leader node having said higher priority.

11. The method of claim 10, wherein said leader node having said higher priority is different than said first leader node.

* * * * *